(12) United States Patent
Cornwell et al.

(10) Patent No.: US 12,013,079 B2
(45) Date of Patent: Jun. 18, 2024

(54) ADJUSTABLE CLAMPING DEVICE AND LEVELING BASE WITH MULTIDIRECTIONAL ADJUSTMENT

(71) Applicant: FatBoy Tripods, LLC, Harlan, IA (US)

(72) Inventors: Casey Cornwell, Harlan, IA (US);
Jeffrey Connor Sharp, Harlan, IA (US)

(73) Assignee: FatBoy Tripods, LLC, Harlan, IA (US)

( * ) Notice: Subject to any disclaimer, the term of this patent is extended or adjusted under 35 U.S.C. 154(b) by 0 days.

(21) Appl. No.: 18/449,220

(22) Filed: Aug. 14, 2023

(65) Prior Publication Data
US 2024/0052971 A1 Feb. 15, 2024

Related U.S. Application Data

(60) Provisional application No. 63/451,412, filed on Mar. 10, 2023, provisional application No. 63/397,798, filed on Aug. 12, 2022.

(51) Int. Cl.
*F16M 11/14* (2006.01)

(52) U.S. Cl.
CPC .................................. *F16M 11/14* (2013.01)

(58) Field of Classification Search
CPC ........ F16M 11/14; F16M 11/24; F16M 11/16; F16M 11/32; F16M 11/041; F16M 11/26; F16M 11/08
See application file for complete search history.

(56) References Cited

U.S. PATENT DOCUMENTS

| | | | |
|---|---|---|---|
| 3,836,986 A * | 9/1974 | Kawazoe | F16M 11/16 396/419 |
| 6,773,172 B1 | 8/2004 | Johnson | |
| 7,077,582 B2 | 7/2006 | Johnson | |
| 7,281,693 B2 * | 10/2007 | Chou | F16M 11/242 403/90 |
| 7,457,535 B2 | 11/2008 | Johnson | |
| 7,658,556 B2 | 2/2010 | Johnson | |
| 8,075,203 B2 | 12/2011 | Johnson | |
| 8,262,299 B2 | 9/2012 | Johnson | |
| 8,398,037 B2 | 3/2013 | Johnson | |
| 8,398,315 B2 | 3/2013 | Johnson | |
| 8,827,574 B2 | 9/2014 | Johnson | |
| 8,827,576 B2 | 9/2014 | Johnson | |
| 9,052,574 B1 | 6/2015 | Johnson | |
| 9,063,397 B2 | 6/2015 | Johnson | |
| 9,097,277 B2 | 8/2015 | Johnson | |
| 9,097,962 B2 | 8/2015 | Johnson | |
| 9,097,963 B2 | 8/2015 | Johnson | |
| 9,213,222 B2 | 12/2015 | Johnson | |

(Continued)

OTHER PUBLICATIONS

International Search Report and Written Opinion for corresponding PCT application No. PCT/US2023/072149 dated Oct. 31, 2023.

*Primary Examiner* — Monica E Millner
(74) *Attorney, Agent, or Firm* — McDonnell Boehnen Hulbert & Berghoff LLP

(57) ABSTRACT

The present disclosure relates to a ball head based leveling base for use with an adjustable clamping device that works in conjunction with commonly available accessory rails for photographic equipment and/or firearms.

26 Claims, 14 Drawing Sheets

(56) References Cited

U.S. PATENT DOCUMENTS

| | | | |
|---|---|---|---|
| 9,280,039 B2 | 3/2016 | Johnson | |
| 9,298,067 B2 | 3/2016 | Johnson | |
| 9,298,068 B2 | 3/2016 | Johnson | |
| 9,298,069 B2 | 3/2016 | Johnson | |
| 9,300,345 B2 | 3/2016 | Johnson | |
| 9,371,958 B2 | 6/2016 | Johnson | |
| 9,372,383 B2 | 6/2016 | Johnson | |
| 9,372,385 B2 | 6/2016 | Johnson | |
| 9,494,276 B2 | 11/2016 | Johnson | |
| 9,568,810 B2 | 2/2017 | Johnson | |
| 9,689,525 B2 | 6/2017 | Johnson | |
| 9,690,171 B2 | 6/2017 | Johnson | |
| 9,696,611 B2 | 7/2017 | Johnson | |
| 9,720,306 B2 | 8/2017 | Johnson | |
| 9,816,662 B2 | 11/2017 | Johnson | |
| D815,679 S | 4/2018 | Johnson | |
| 9,958,759 B2 | 5/2018 | Johnson | |
| 9,989,190 B2 * | 6/2018 | Torbitt | F16M 11/32 |
| 10,012,890 B2 | 7/2018 | Johnson | |
| 10,012,891 B2 | 7/2018 | Johnson | |
| 10,054,256 B2 | 8/2018 | Johnson | |
| 10,175,561 B2 | 1/2019 | Johnson | |
| 10,241,383 B2 | 3/2019 | Johnson | |
| 10,267,452 B2 | 4/2019 | Johnson | |
| 10,274,125 B2 | 4/2019 | Johnson | |
| 10,281,803 B2 | 5/2019 | Johnson | |
| 10,359,147 B1 | 7/2019 | Johnson | |
| 10,365,544 B2 | 7/2019 | Johnson | |
| 10,365,545 B2 | 7/2019 | Johnson | |
| 10,422,467 B2 | 9/2019 | Johnson | |
| 10,473,261 B2 | 11/2019 | Johnson | |
| 10,474,011 B2 | 11/2019 | Johnson | |
| 10,564,526 B2 | 2/2020 | Johnson | |
| 10,571,211 B2 | 2/2020 | Johnson | |
| 10,585,337 B2 | 3/2020 | Johnson | |
| 10,612,718 B2 | 4/2020 | Johnson | |
| 10,613,421 B2 | 4/2020 | Johnson | |
| 10,663,107 B2 | 5/2020 | Johnson | |
| 10,754,228 B2 | 8/2020 | Johnson | |
| 10,768,510 B2 | 9/2020 | Johnson | |
| 10,824,056 B2 | 11/2020 | Johnson | |
| 10,883,650 B2 | 1/2021 | Johnson | |
| 10,883,653 B2 | 1/2021 | Johnson | |
| 10,976,000 B2 | 4/2021 | Johnson | |
| 11,036,116 B2 | 6/2021 | Johnson | |
| 11,047,641 B2 | 6/2021 | Johnson | |
| 11,067,216 B2 | 7/2021 | Johnson | |
| 11,085,736 B2 | 8/2021 | Johnson | |
| 11,150,541 B2 | 10/2021 | Johnson | |
| 11,163,219 B2 | 11/2021 | Johnson | |
| 11,221,544 B1 * | 1/2022 | York | F16M 11/24 |
| 11,236,854 B2 | 2/2022 | Johnson | |
| 11,237,463 B2 | 2/2022 | Johnson | |
| 11,242,951 B2 | 2/2022 | Johnson | |
| 11,269,239 B2 | 3/2022 | Johnson | |
| 11,287,082 B2 | 3/2022 | Johnson | |
| 11,703,744 B2 * | 7/2023 | Chan | G03B 17/566 248/316.2 |
| 2005/0151036 A1 | 7/2005 | Speggiorin | |
| 2005/0242250 A1 * | 11/2005 | Keng | F16M 11/26 248/512 |
| 2006/0177215 A1 * | 8/2006 | Johnson | F16M 11/08 396/419 |
| 2007/0152115 A1 | 7/2007 | Chou | |
| 2017/0314729 A1 | 11/2017 | Torbitt | |
| 2018/0324360 A1 | 11/2018 | Gabrielli | |
| 2019/0271902 A1 * | 9/2019 | Chan | F16M 11/041 |
| 2019/0331459 A1 | 10/2019 | Johnson | |
| 2020/0025330 A1 * | 1/2020 | Li | F16M 11/2078 |
| 2020/0218139 A1 * | 7/2020 | Tiefenbrunn | F16B 2/12 |
| 2020/0292124 A1 | 9/2020 | Li | |
| 2021/0011359 A1 | 1/2021 | Johnson | |
| 2021/0190260 A1 | 6/2021 | Johnson | |
| 2021/0190261 A1 * | 6/2021 | Warner | F16M 11/16 |
| 2021/0285738 A1 | 9/2021 | Johnson | |
| 2021/0310606 A1 | 10/2021 | Johnson | |
| 2021/0325149 A1 | 10/2021 | Johnson | |
| 2021/0364777 A1 | 11/2021 | Chan | |
| 2022/0019133 A1 | 1/2022 | Johnson | |
| 2022/0026784 A1 | 1/2022 | Johnson | |
| 2022/0107048 A1 | 4/2022 | Johnson | |
| 2022/0107553 A1 | 4/2022 | Johnson | |
| 2022/0113610 A1 | 4/2022 | Chan | |
| 2023/0349506 A1 * | 11/2023 | Wilson | F16M 11/32 |

\* cited by examiner

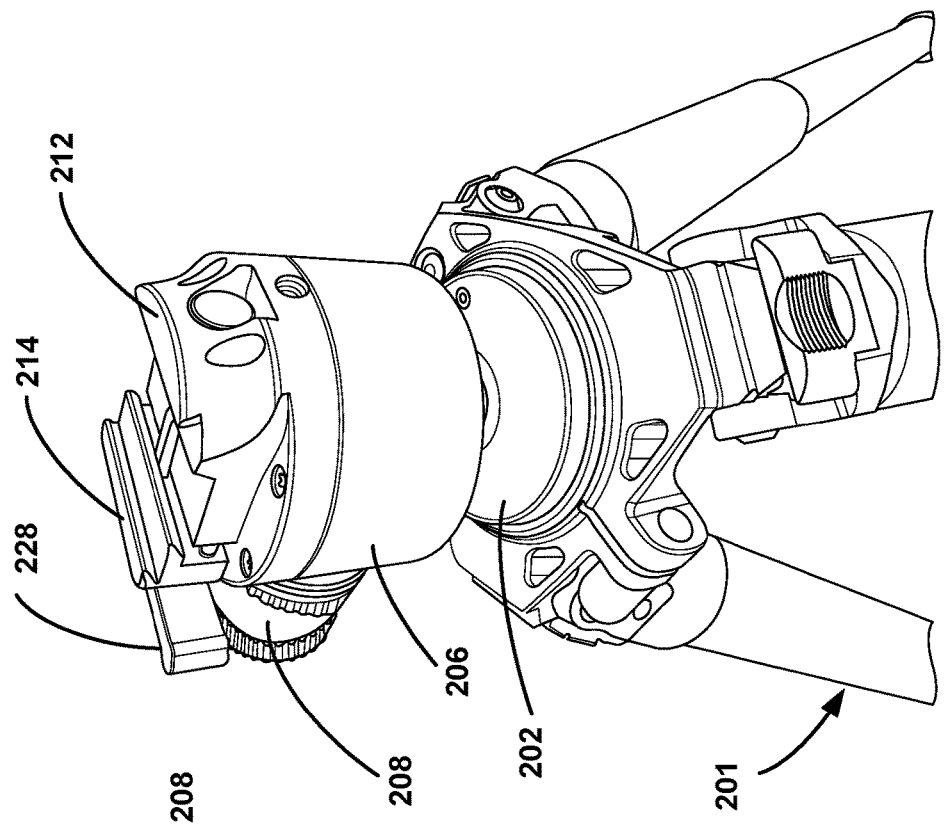
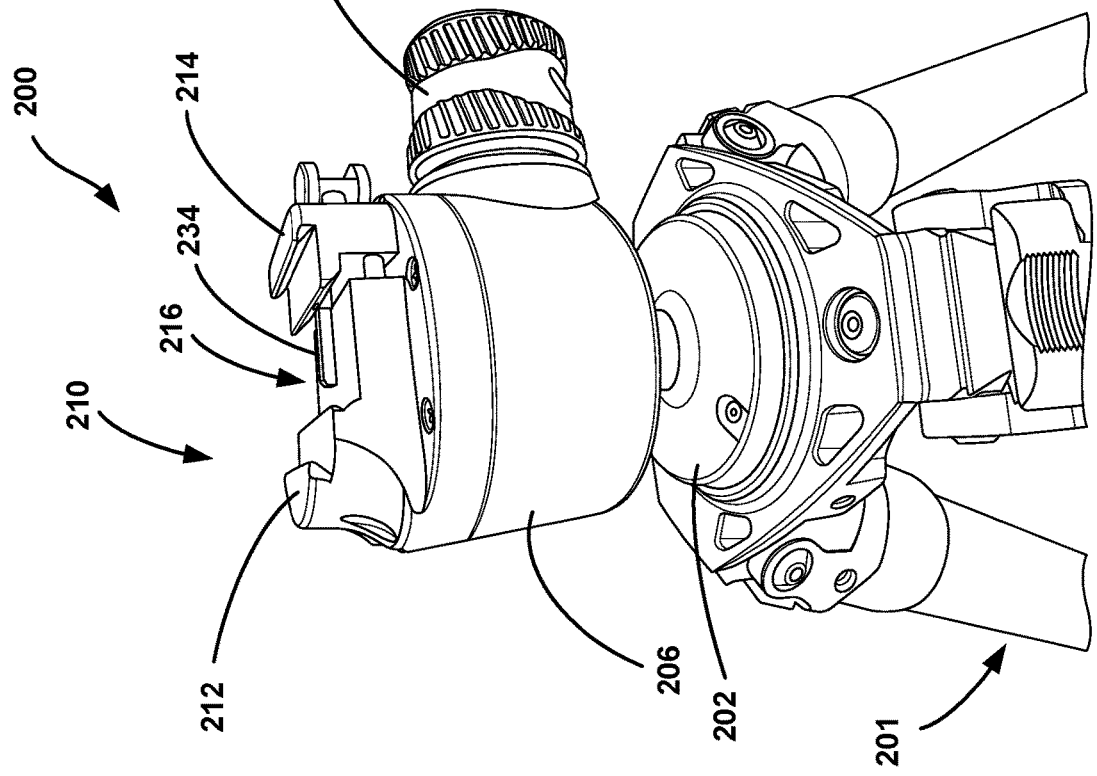
FIG. 12
FIG. 13

ADJUSTABLE CLAMPING DEVICE AND LEVELING BASE WITH MULTIDIRECTIONAL ADJUSTMENT

CROSS-REFERENCE TO RELATED APPLICATIONS

This application claims priority to (i) U.S. Provisional Application No. 63/397,798 entitled "Adjustable Clamping Device," filed on Aug. 12, 2022, and (ii) U.S. Provisional Application No. 63/451,412 entitled "Leveling Base with Multidirectional Adjustment," filed on Mar. 10, 2023, the contents of each of which are hereby incorporated by reference in their entirety.

TECHNICAL FIELD

The present disclosure relates to an adjustable clamping device and leveling base with multidirectional adjustment, particularly for use with a tripod in connection with a quick release mounting device for photographic equipment and/or firearms.

BACKGROUND

Unless otherwise indicated herein, the materials described in this section are not admitted to be prior art to the claims in this application.

A leveling base is the part of a tripod system (or quad pod system) that attaches the supported device (such as a still photographic device or a firearm) to the tripod legs, and allows the orientation of the supported device to be manipulated or locked down. Modular or stand-alone leveling bases can be used on a wide range of tripods, allowing the user choose which type of head best suits their needs. Often, the leveling base includes a generally cylindrical housing, which has a connection mechanism at one end for a tripod. A ball member in the housing is movably engaged and is provided with a locking device at one end thereof for supporting the supported device. In the leveling base of this type, the ball member is generally a spherical ball having an extension for connecting to a locking device, and the locking device normally consists essentially of a split clamp having a recess adapted to mate with a plate attached to the optical instrument, and a clamping screw for securing the ball in place in the housing.

In general, the principal function of leveling bases are to provide the ability to hold the supported device fixed in a specific orientation until the user desires to change its position. Unfortunately, traditional locking devices are cumbersome and not positioned in a location that makes locking and unlocking of the ball member easy. As such, an improved leveling base for a tripod that is more intuitively able to lock and unlock the leveling base to thereby adjust the position of the supported device fixed in a specific orientation may be desirable.

A Picatinny rail, also known as a MIL-STD-1913 rail, or Standardization Agreement 2324 rail, or also generally a NATO Accessory Rail referred to as STANAG 4694, is a bracket on some firearms that provides a mounting platform consisting of rails with multiple transverse slots. The Picatinny rail is designed to mount heavy sights and other attachments to the upper, side, or lower surfaces of all manner of weapons. The Picatinny rail consists of a strip undercut to form a flattened T cross-section provided with crosswise slots at intervals interspersed with flats that allow accessories to be slid into place from the end of the rail then locked in place, slid into the slots between raised flats then moved a short distance back or forth or clamped to the rail.

Unfortunately, traditional adjustable clamping devices that are detachably secured to the Picatinny rail tends to permit the firearm to slide within the clamp if not sufficiently secured in an efficient manner. As such, an improved clamping device that is sufficiently straightforward to use while reducing the likelihood of losing lockup during articulation may be desirable.

SUMMARY

In view of the foregoing, the present disclosure relates to a leveling base with multidirectional adjustment. More specifically, a ball head based leveling base for use with an adjustable clamping device that works in conjunction with commonly available accessory rails for photographic equipment and/or firearms.

In a first aspect, the present disclosure provides a leveling base. The leveling base includes a housing including a cavity. The leveling base further includes a rotatable component positioned at least partially within the cavity of the housing. The rotatable component is rotatably maintained within the cavity to thereby enable a rotation of the rotatable component with respect to the housing. The leveling base further includes a hollow elongated member having a first end and a second end opposite the first end. The first end of the hollow elongated member is coupled to a bottom surface of the rotatable component. The leveling base further includes an inner rod having a first end and a second end opposite the first end. The first end of the inner rod is positioned within the hollow elongated member. The leveling base further includes a rotatable arm having a first end and a second end opposite the first end. The first end of the rotatable arm is pivotally coupled to the second end of the inner rod. The rotatable arm is configured to rotate from a first position in which a longitudinal axis of the rotatable arm is substantially parallel to a longitudinal axis of the inner rod to a second position in which the longitudinal axis of the rotatable arm is positioned at a non-zero angle with respect to the longitudinal axis of the inner rod. The first end of the inner rod contacts the rotatable component to thereby prevent rotation of the rotatable component with respect to the housing when the rotatable arm is in the first position, and the first end of the inner rod does not contact the rotatable component to thereby enable rotation of the rotatable component with respect to the housing when the rotatable arm is in the second position.

In a second aspect, the present disclosure provides an adjustable clamping device used to removably secure a firearm or photographic equipment to a support structure. The adjustable clamping device comprises (a) a base, (b) a ball coupled to and extending vertically from the base, (c) a housing including a cavity configured to receive the ball, wherein the ball is rotatably maintained within the cavity to thereby enable a rotation of the housing with respect to the ball, (d) a locking member configured to selectively inhibit movement of the housing with respect to the ball, and (e) a mounting structure positioned on a top surface of the housing, the mounting structure comprising (i) a first wall fixed with respect to the top surface of the housing, (ii) a second wall moveable with respect to the first wall, (iii) a channel positioned between the first wall and the second wall, (iv) at least one spring positioned between the first wall and the second wall, wherein the at least one spring is configured to bias the second wall away from the first wall, (v) an elongated rod having a first end and a second end opposite the first end, wherein the first end of the elongated rod extends through the first wall, and wherein the second end of the elongated rod extends through the second wall, (vi) a rotatable member coupled to the first end of the elongated rod, wherein a rotation of the rotatable member adjusts a distance between the first wall and the second wall, and (vii) a lever coupled to the second end of the elongated rod, wherein the lever includes a cam portion that rotates about a pivot axis to contact the second wall as the lever is moved between an unlocked position and a locked position, and wherein a distance between the first wall and the second wall is greater in the unlocked position than in the locked position.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 12 illustrates another perspective view of the adjustable clamping device of FIG. 10, according to an exemplary embodiment.

FIG. 13 illustrates another perspective view of the adjustable clamping device of FIG. 10, according to an exemplary embodiment.

DETAILED DESCRIPTION

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The exemplary embodiments described herein are not meant to be limiting. It will be readily understood that the aspects of the present disclosure, as generally described herein and illustrated in the figures, can be arranged, substituted, combined, separated, and designed in a wide variety of different configurations, all of which are explicitly contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, apparatus, element and method "configured to" perform a specified function is indeed capable of performing the specified function without any alteration, rather than merely having potential to perform the specified function after further modification. In other words, the apparatus, element, and method "configured to" perform a specified function is specifically selected, created, implemented, utilized, programmed, and/or designed for the purpose of performing the specified function. As used herein, "configured to" refers to existing characteristics of an apparatus, element, and method which enable the apparatus, element, and method to perform the specified function without further modification. For purposes of this disclosure, an apparatus, element, and method described as being "configured to" perform a particular function can additionally or alternatively be described as being "adapted to" and/or as being "operative to" perform that function.

As used herein, with respect to measurements, "about" means +/−5%.

Figure 7:
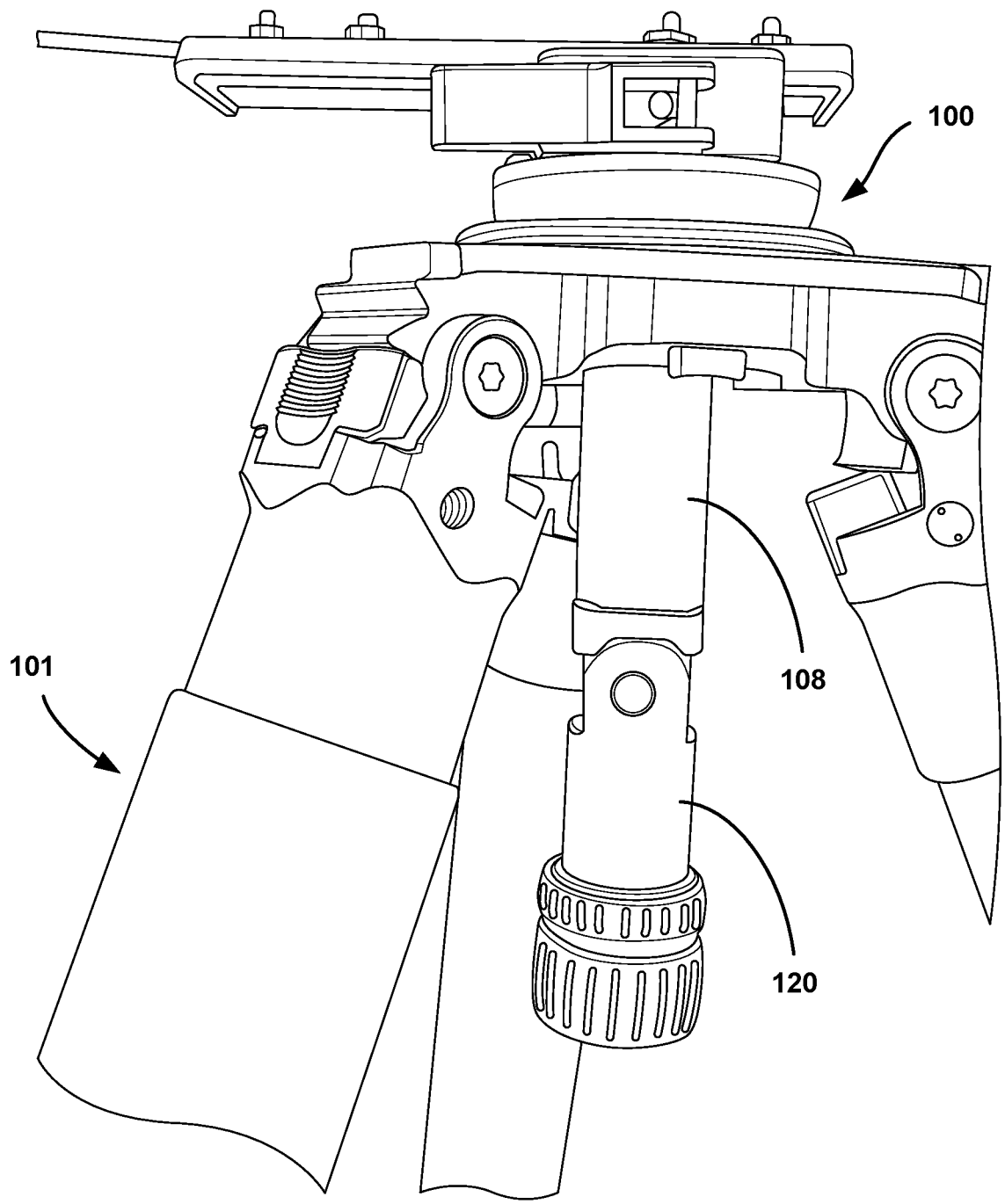
FIG. 7 illustrates a perspective view of the leveling base of FIG. 1 positioned within a tripod with the rotatable arm in a first position, according to an exemplary embodiment.
Figure 8:
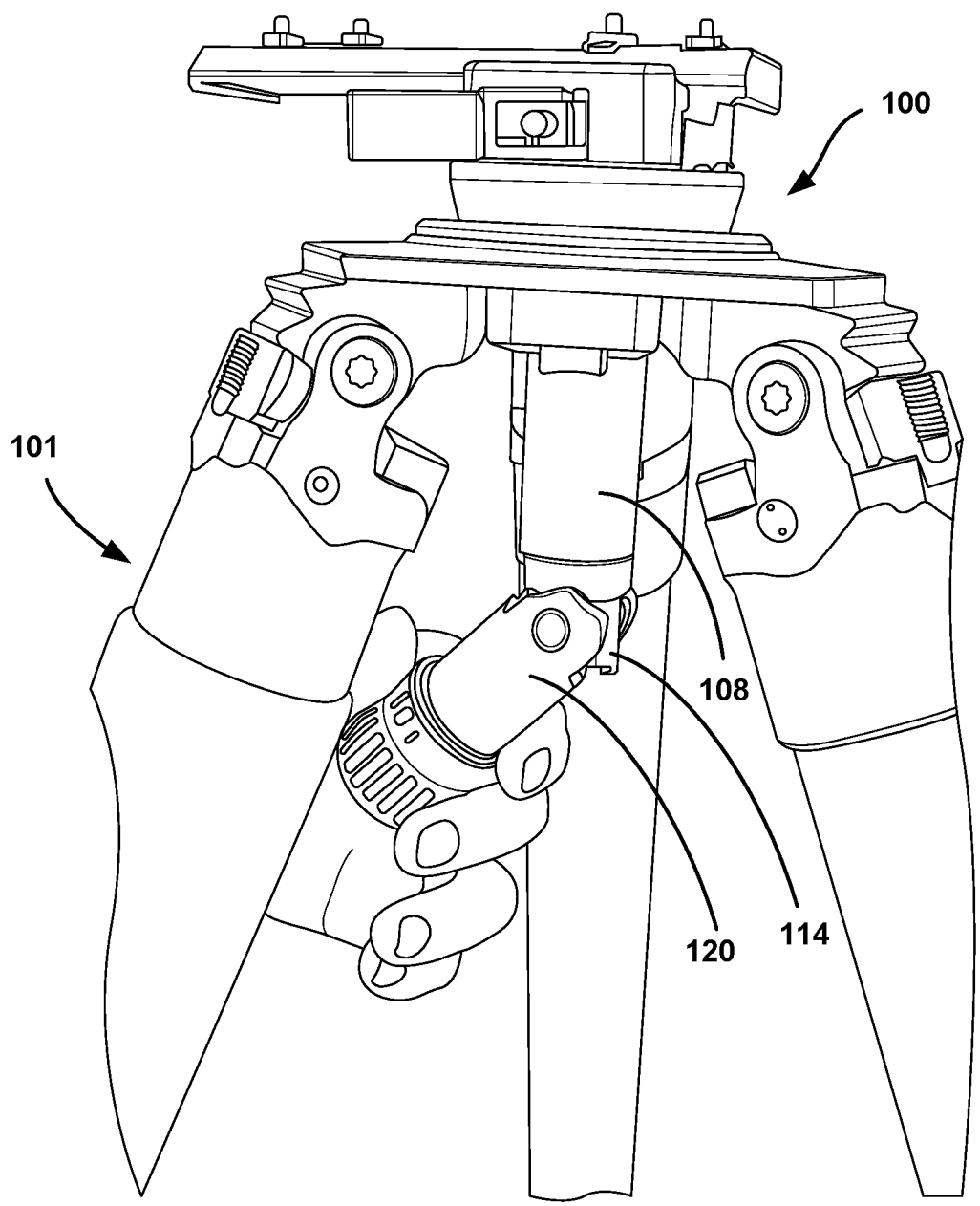
FIG. 8 illustrates a perspective view of the leveling base of FIG. 1 positioned within a tripod with the rotatable arm in a second position, according to an exemplary embodiment.
Figure 9:
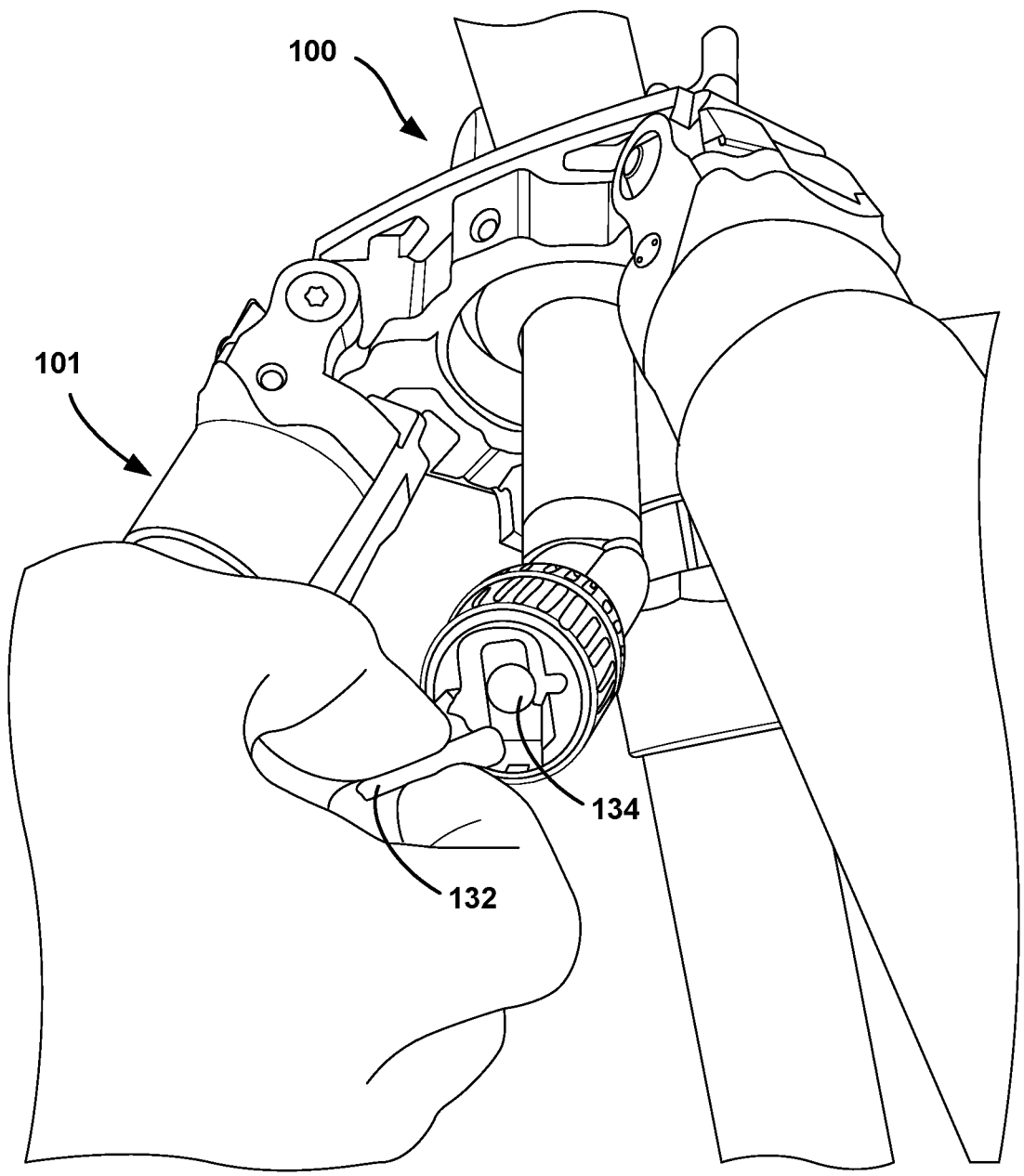
FIG. 9 illustrates a perspective view of the leveling base of FIG. 1 positioned within a tripod with the rotatable arm in a second position with a tool removably positioned in the rotatable arm, according to an exemplary embodiment.
Figure 11:
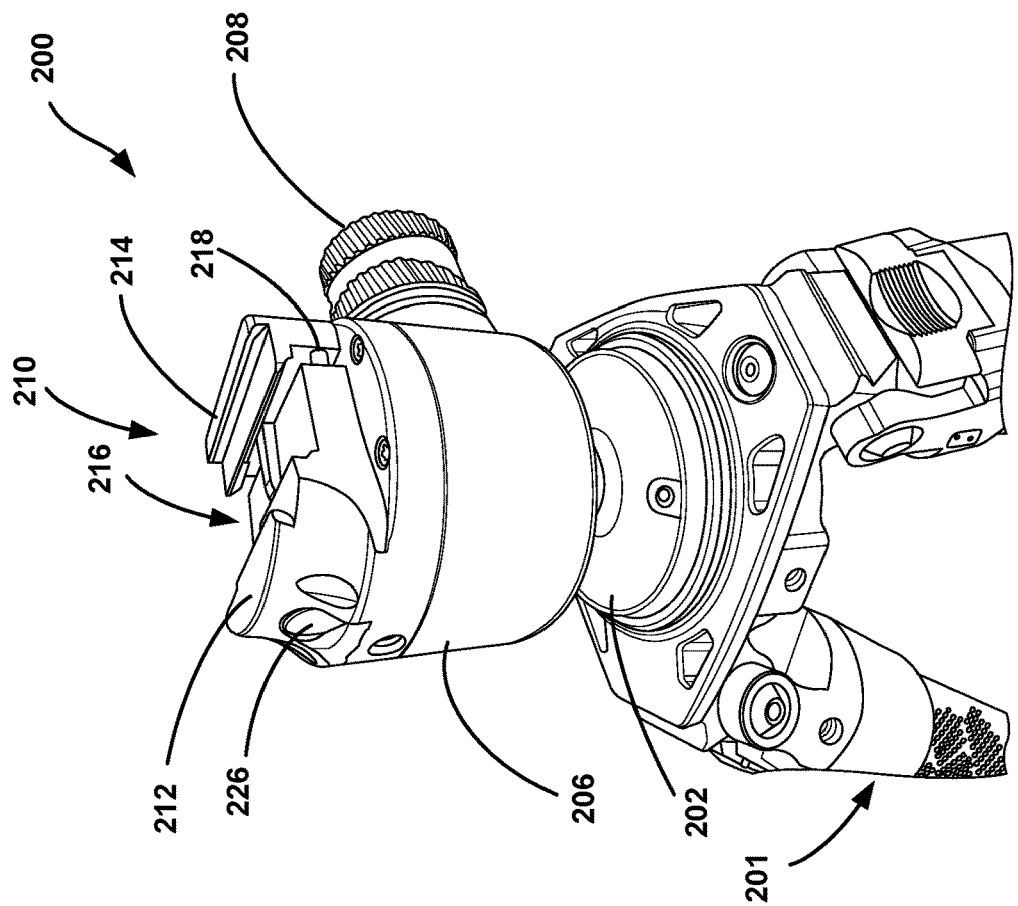
FIG. 11 illustrates another perspective view of the adjustable clamping device of FIG. 10, according to an exemplary embodiment.
Figure 10:
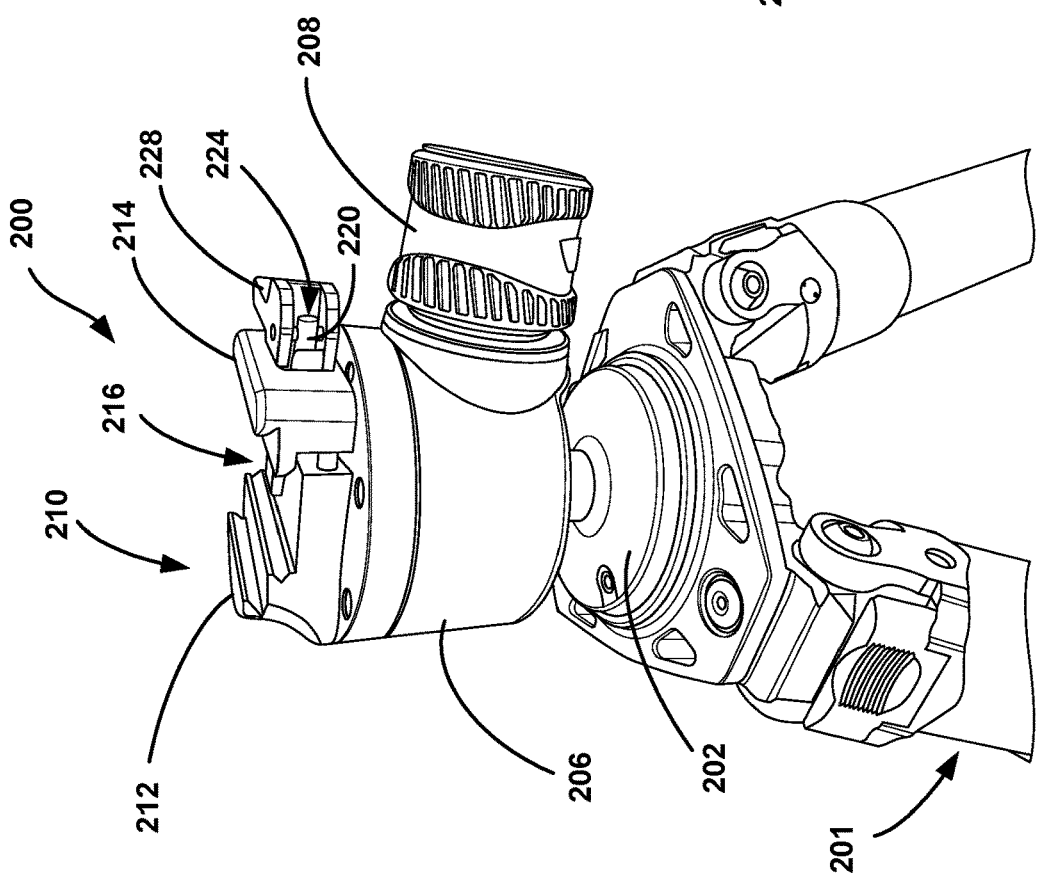
FIG. 10 illustrates a perspective view of an adjustable clamping device, according to an exemplary embodiment.
Figure 15:
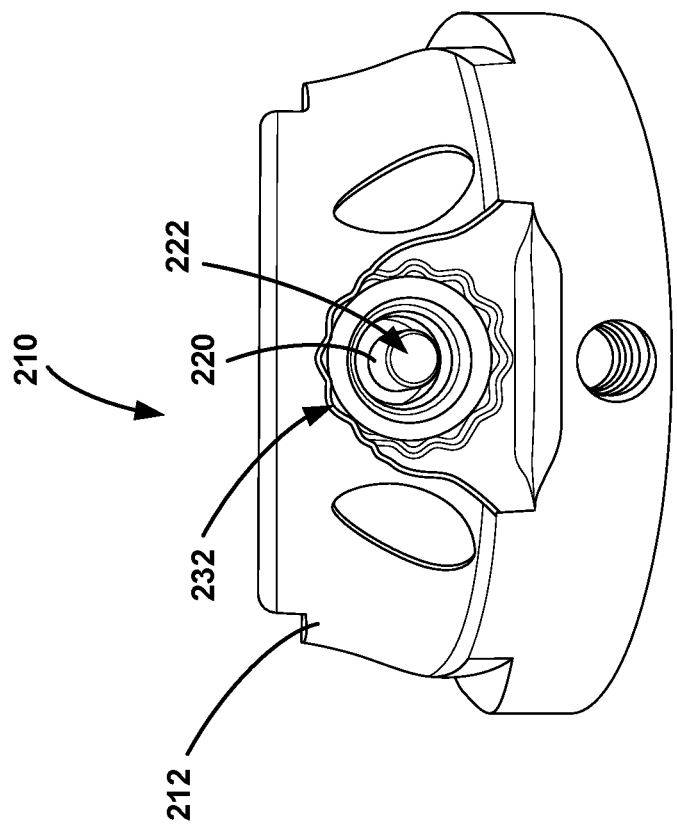
FIG. 15 illustrates another side view of the adjustable clamping device of FIG. 10, according to an exemplary embodiment.

In a first aspect, as shown in FIGS. 1-9, the present disclosure provides a leveling base 100. The leveling base 100 includes a housing 102 including a cavity 104. In one example, the housing 102 is configured to be removably positioned within a corresponding hole in a support structure 101 (such as a tripod or quad pod as non-limiting examples) as shown in FIGS. 7-9. The leveling base 100 further includes a rotatable component 106 positioned at least partially within the cavity 104 of the housing 102. The rotatable component 106 is rotatably maintained within the cavity 104 to thereby enable a rotation of the rotatable component 106 with respect to the housing 102. In one example, at least a portion of the rotatable component 106 comprises a spherical shape. The leveling base 100 further includes a hollow elongated member 108 having a first end 110 and a second end 112 opposite the first end 110. The first end 110 of the hollow elongated member 108 is coupled to a bottom surface of the rotatable component 106. The leveling base 100 further includes an inner rod 114 having a first end 116 and a second end 118 opposite the first end 116. The first end 116 of the inner rod 114 is positioned within the hollow elongated member 108.

The leveling base 100 further includes a rotatable arm 120 having a first end 122 and a second end 124 opposite the first end 122. The first end 122 of the rotatable arm 120 is pivotally coupled to the second end 118 of the inner rod 114. The rotatable arm 120 is configured to rotate from a first position in which a longitudinal axis of the rotatable arm 120 is substantially parallel to a longitudinal axis of the inner rod 114 to a second position in which the longitudinal axis of the rotatable arm 120 is positioned at a non-zero angle with respect to the longitudinal axis of the inner rod 114. The first end 116 of the inner rod 114 contacts the rotatable component 106 to thereby prevent rotation of the rotatable component 106 with respect to the housing 102 when the rotatable arm 120 is in the first position, and the first end 116 of the inner rod 114 does not contact the rotatable component 106 to thereby enable rotation of the rotatable component 106 with respect to the housing 102 when the rotatable arm 120 is in the second position.

In another example, the first end 116 of the inner rod 114 applies a first force to the rotatable component 106 to thereby prevent rotation of the rotatable component 106 with respect to the housing 102 when the rotatable arm 120 is in the first position, and the first end 116 of the inner rod 114 applies a second force (that is less than the first force) to the rotatable component 106 to thereby enable rotation of the rotatable component 106 with respect to the housing 102 when the rotatable arm 120 is in the second position.

In one example, a length of the hollow elongated member 108 is longer than a length of the rotatable arm 120. In another example, a length of the rotatable arm 120 is longer than a length of the hollow elongated member 108. In yet another example, a length of the hollow elongated member 108 is substantially equal to a length of the rotatable arm 120.

In one example, a distance between the first end 116 of the inner rod 114 and the rotatable component 106 is greater when the rotatable arm 120 is in the second position than when the rotatable arm 120 is in the first position. As described above, this increase in distance between the first end 116 of the inner rod 114 and the rotatable component 106 enables rotation of the rotatable component 106 with respect to the housing 102 when the rotatable arm 120 is in the second position.

Figure 1:
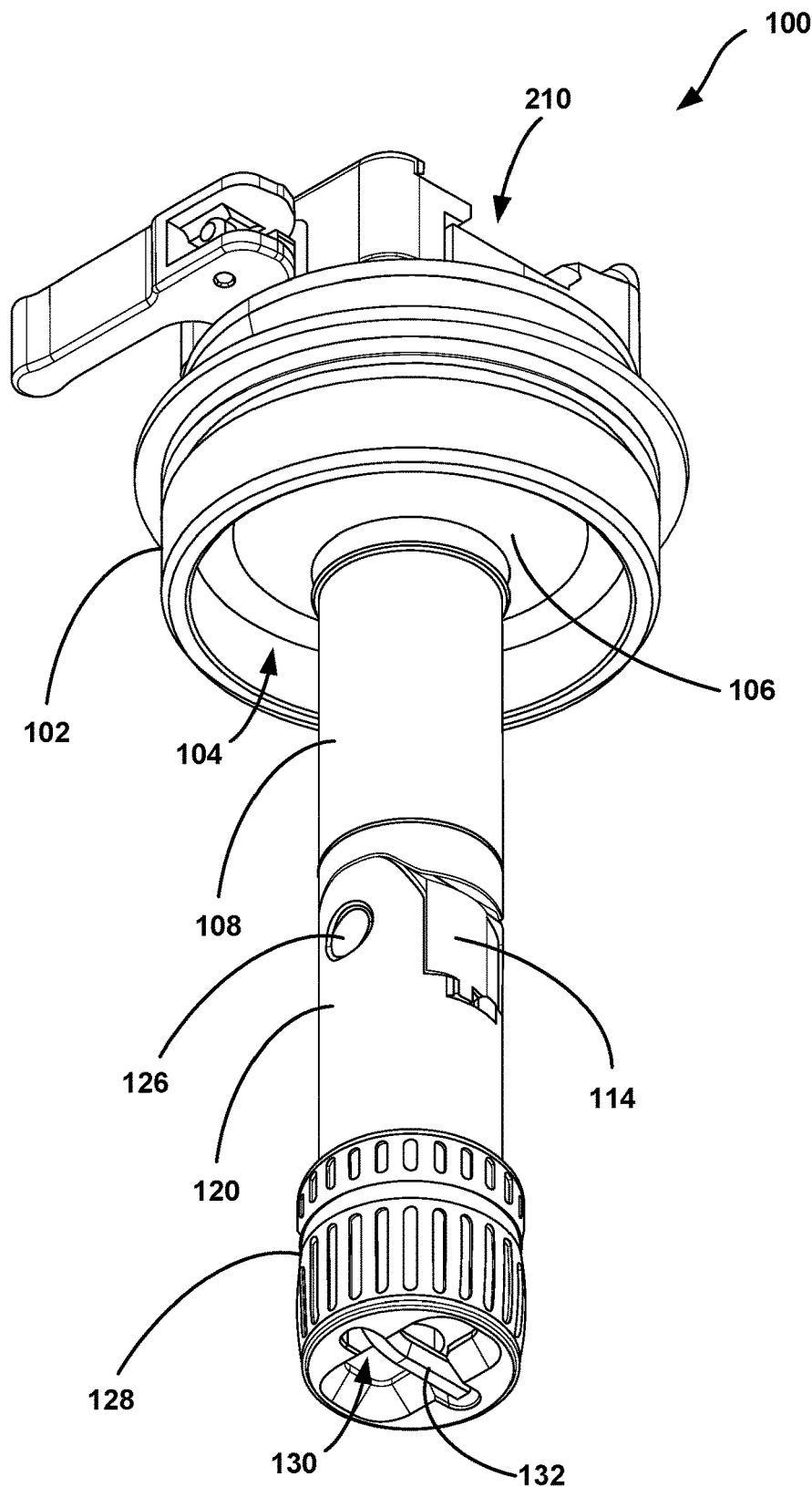
FIG. 1 illustrates a perspective view of a leveling base, according to an exemplary embodiment.
Figure 2:
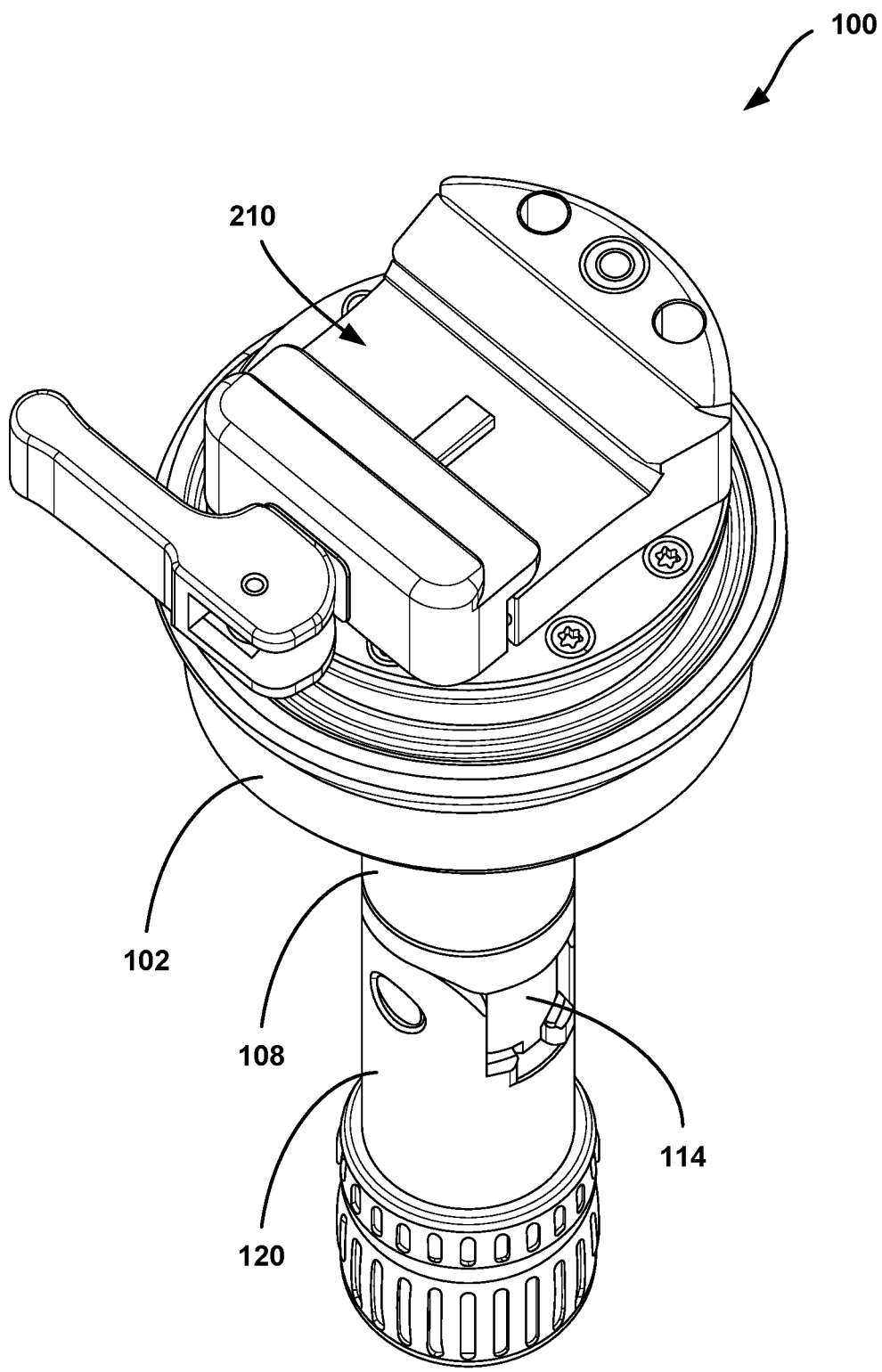
FIG. 2 illustrates another perspective view of the leveling base of FIG. 1, according to an exemplary embodiment.
Figure 3:
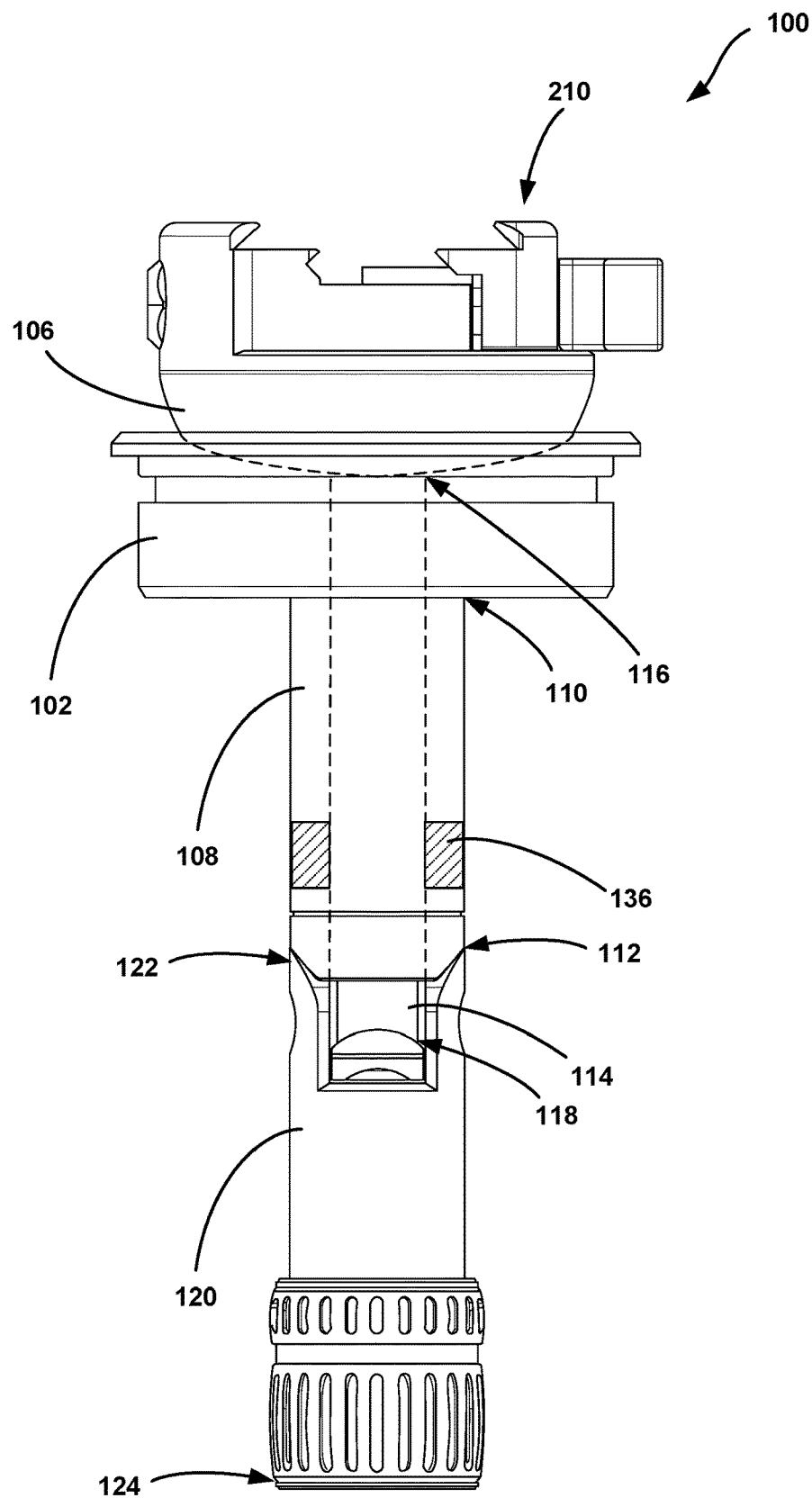
FIG. 3 illustrates a side view of the leveling base of FIG. 1, according to an exemplary embodiment.
Figure 4:
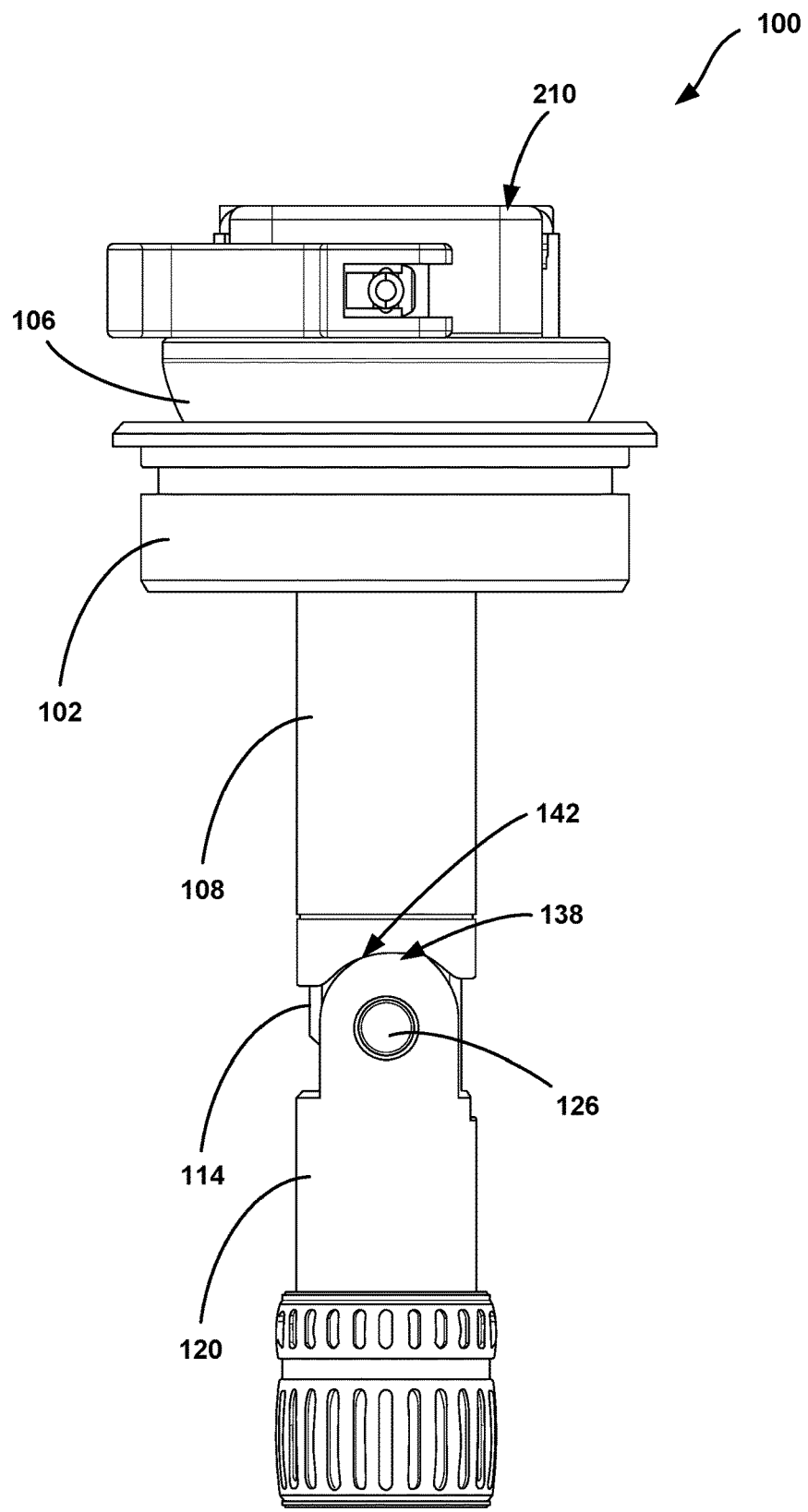
FIG. 4 illustrates another side view of the leveling base of FIG. 1, according to an exemplary embodiment.
Figure 5:
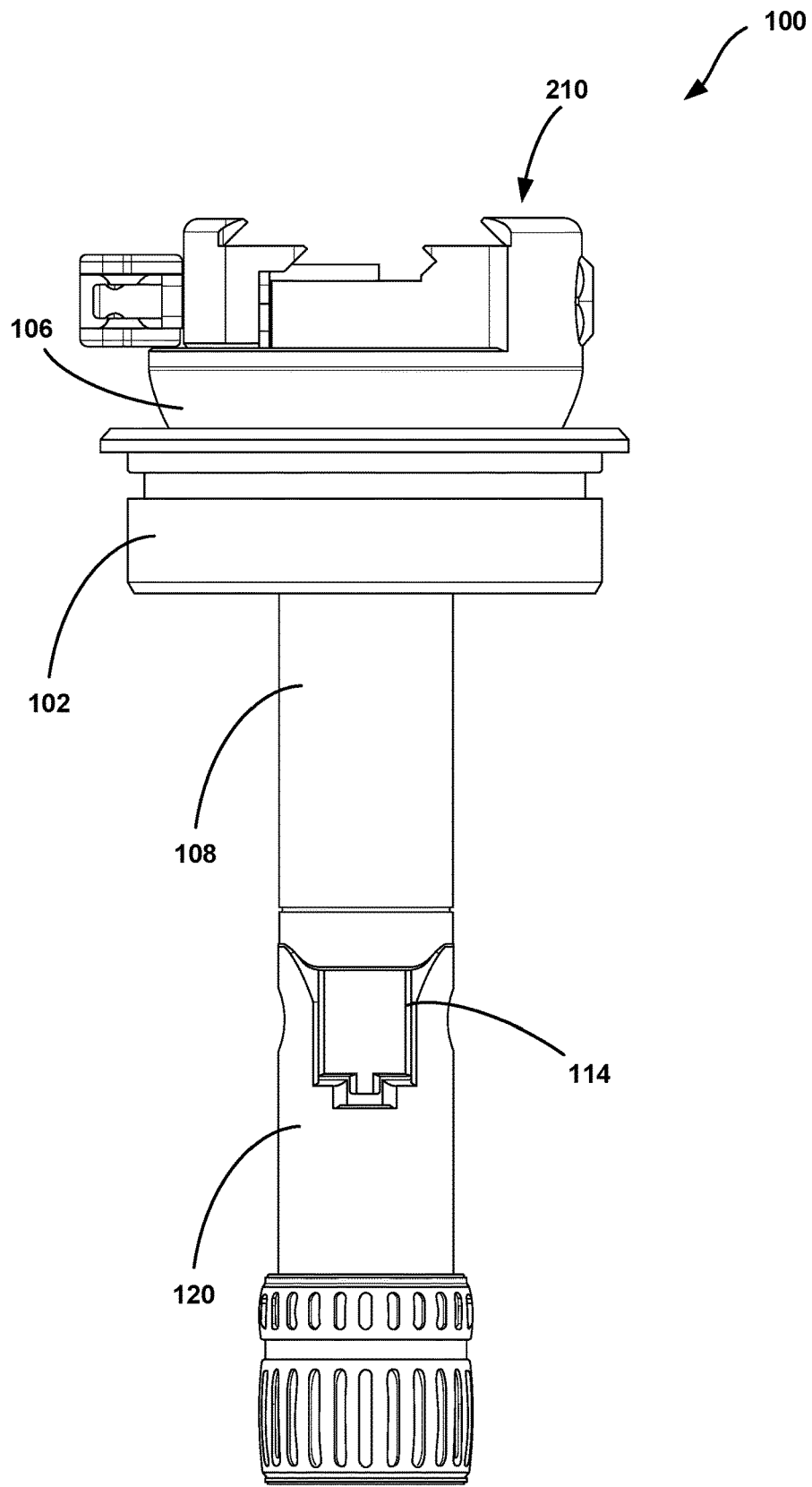
FIG. 5 illustrates another side view of the leveling base of FIG. 1, according to an exemplary embodiment.
Figure 6:
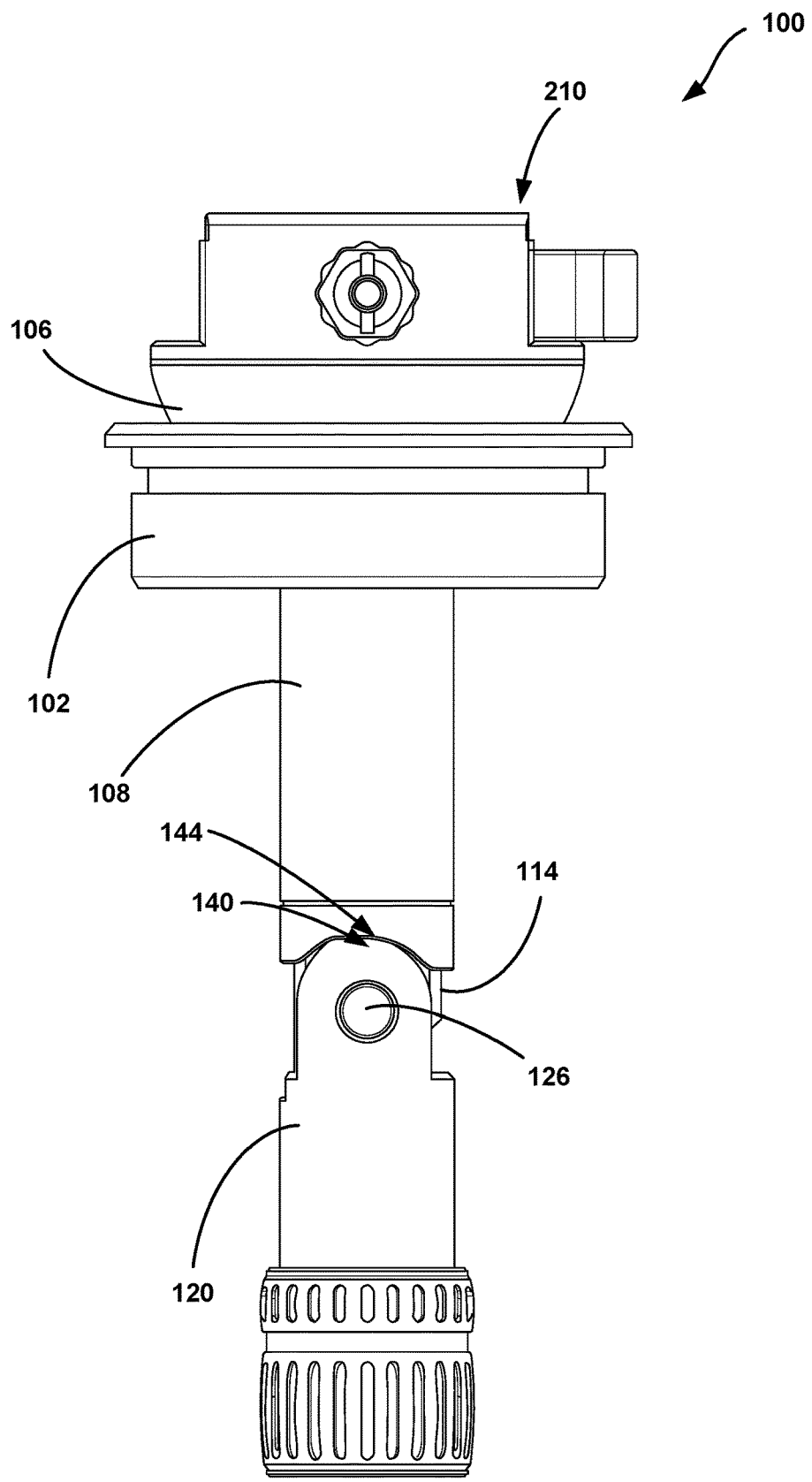
FIG. 6 illustrates another side view of the leveling base of FIG. 1, according to an exemplary embodiment.

In one example, as shown in FIG. 1, the first end 122 of the rotatable arm 120 is pivotally coupled to the second end 118 of the inner rod 114 via a pin 126. As further shown in FIG. 1, in one example the second end 124 of the rotatable arm 120 includes a gripping portion 128.

In one example, a distance between the first end 116 of the inner rod 114 and the rotatable component 106 when the rotatable arm 120 is in the second position is adjustable. Such an arrangement may provide a user with the ability to more finely tune how rigidly the rotatable component 106 is fixed with respect to the housing 102 when the rotatable arm 120 is in the first position. In one example, as shown in FIG. 9, the second end 124 of the rotatable arm 120 includes a recess 130 configured to removably house a tool 132 configured to adjust the distance between the first end 116 of the inner rod 114 and the rotatable component 106 when the rotatable arm 120 is in the second position. The second end 124 of the rotatable arm 120 may further include a magnet 134 to thereby removably house the tool 132 in the rotatable arm 120 when not in use. In one example, the tool 132 comprises an Allen wrench. In one example, the tool 132 is used to rotate a component within the inner rod 114 to thereby adjust the distance between the first end 116 of the inner rod 114 and the rotatable component 106 when the rotatable arm 120 is in the first position.

In one example, the leveling base 100 further includes a resilient member 136 positioned at least partially within the hollow elongated member 108. The resilient member 136 biases the first end 116 of the inner rod away from the rotatable component 106.

In one example, the first end 122 of the rotatable arm 120 includes a first cam surface 138 and a second cam surface 140, and the hollow elongated member 108 includes a first cutout 142 and a second cutout 144 configured to receive the first cam surface 138 and a second cam surface 140 when the rotatable arm 120 is in the first position.

In one example, the leveling base 100 may also includes a mounting structure 210 positioned on a top surface of the rotatable component 106. The mounting structure 210 may include one or more features of the mounting structure 210 described below in relation to FIGS. 10-19.

In a second aspect, with respect to FIGS. 10-19, the present disclosure provides an adjustable clamping device 200 that includes a base 202, a ball 204 coupled to and extending vertically from the base 202, and a housing 206 including a cavity configured to receive the ball 204. In use, the base 202 is configured to be removably coupled to a support structure 201 (such as a tripod or quad pod as non-limiting examples). The ball 204 is rotatably maintained within the cavity to thereby enable a rotation of the housing 206 with respect to the ball 204. In one example, the ball 204 has a diameter of 40 mm. In another example, the ball 204 has a diameter of about 60 mm. Other sizes for the ball 204 are possible as well. The adjustable clamping device 200 also includes a locking member 208 configured to selectively inhibit movement of the housing 206 with respect to the ball 204. In one example, the locking member 208 comprises a screw mechanism. The adjustable clamping device 200 also includes a mounting structure 210 positioned on a top surface of the housing 206. In one example, the mounting structure 210 is removably coupled to the housing 206 (e.g., via a plurality of screws as a non-limiting example).

The mounting structure 210 includes a first wall 212 fixed with respect to the top surface of the housing 206, a second wall 214 moveable with respect to the first wall 212, and a channel 216 positioned between the first wall 212 and the second wall 214. The mounting structure 210 also includes at least one spring 218 positioned between the first wall 212 and the second wall 214. The at least one spring 218 is configured to bias the second wall 214 away from the first wall 212. The mounting structure 210 also includes an elongated rod 220 having a first end 222 and a second end 224 opposite the first end 222. The first end 222 of the elongated rod 220 extends through the first wall 212, and the second end 224 of the elongated rod 220 extends through the second wall 214. In one example, the elongated rod 220 is positioned between the channel 216 and the top surface of the housing 206.

The mounting structure 210 also includes a rotatable member 226 coupled to the first end 222 of the elongated rod 220. A rotation of the rotatable member 226 adjusts a distance between the first wall 212 and the second wall 214. The mounting structure 210 also includes a lever 228 coupled to the second end 224 of the elongated rod 220. The lever 228 includes a cam portion 230 that rotates about a pivot axis to contact the second wall 214 as the lever 228 is moved between an unlocked position and a locked position. A distance between the first wall 212 and the second wall 214 is greater in the unlocked position than in the locked position.

In one example, the cam portion 230 of the lever 228 has an asymmetrical shape about the pivot axis so that the lever 228 pushes the second wall 214 towards the first wall 212 as the lever 228 is moved from the unlocked position for releasing equipment from the adjustable clamping device 200 to the locked position for gripping equipment to the adjustable clamping device 200. Conversely, as the lever 228 is moved from the locked position to the unlocked position, the at least one spring 218, pushes the second wall 214 away from the first wall 212 so that the channel 216 expands.

Figure 14:
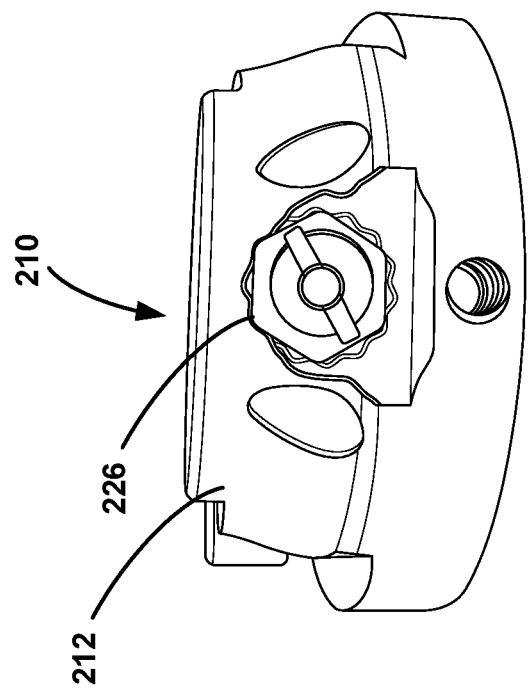
FIG. 14 illustrates a side view of the adjustable clamping device of FIG. 10, according to an exemplary embodiment.
Figure 17:
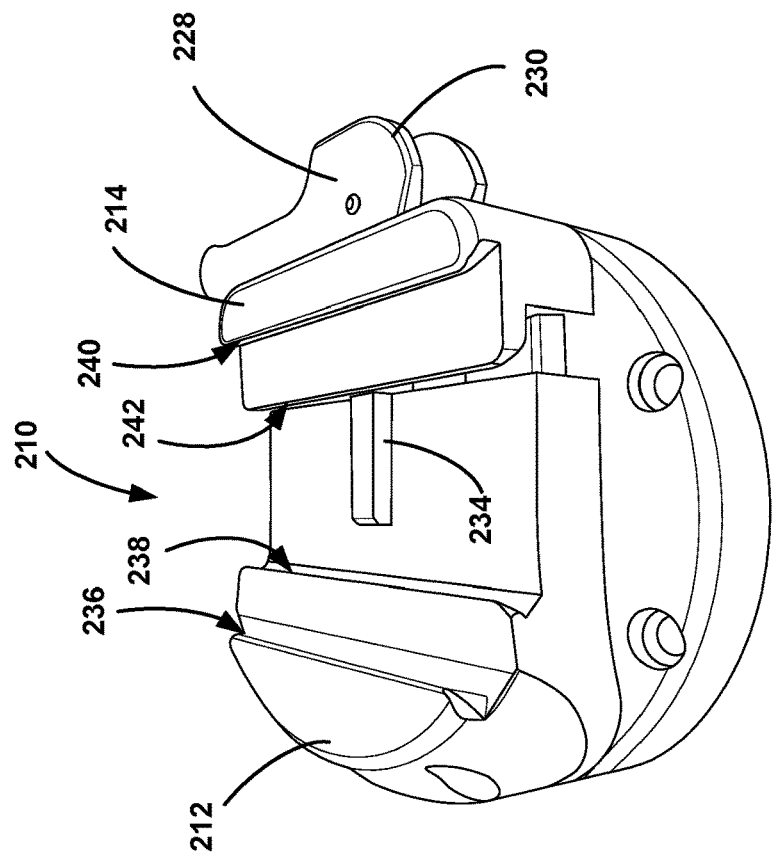
FIG. 17 illustrates another perspective view of the adjustable clamping device of FIG. 10, according to an exemplary embodiment.
Figure 16:
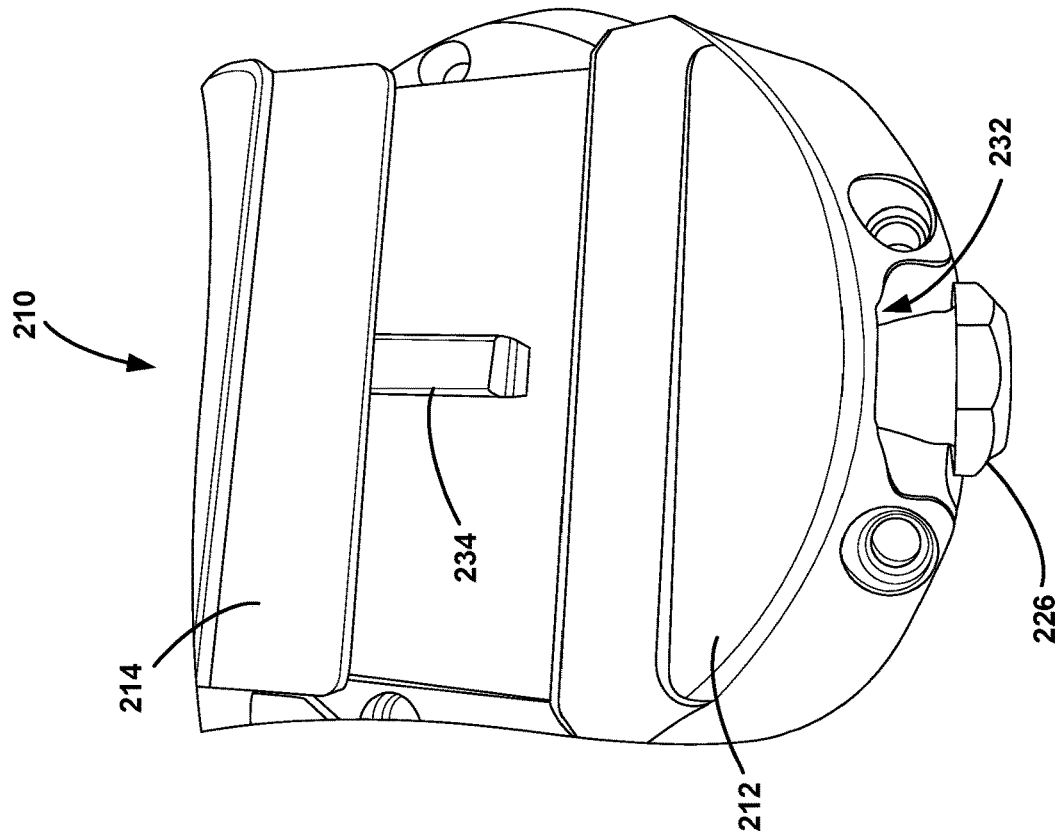
FIG. 16 illustrates another perspective view of the adjustable clamping device of FIG. 10, according to an exemplary embodiment.
Figure 19:
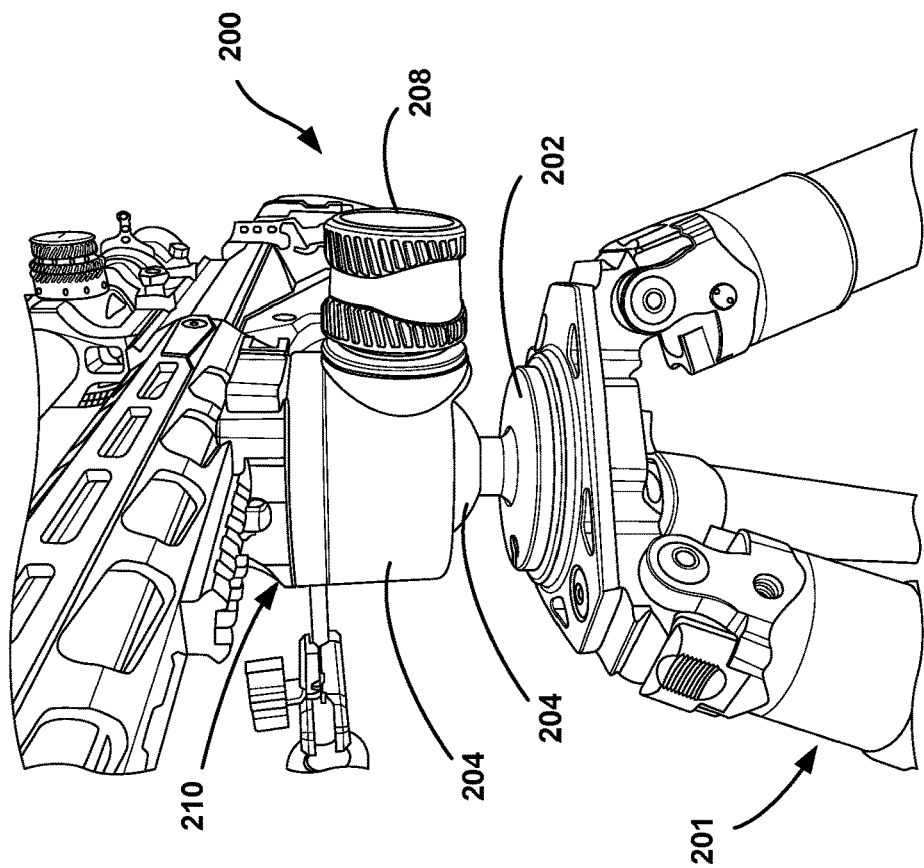
FIG. 19 illustrates a perspective view of the adjustable clamping device of FIG. 10 coupled to a firearm, according to an exemplary embodiment.
Figure 18:
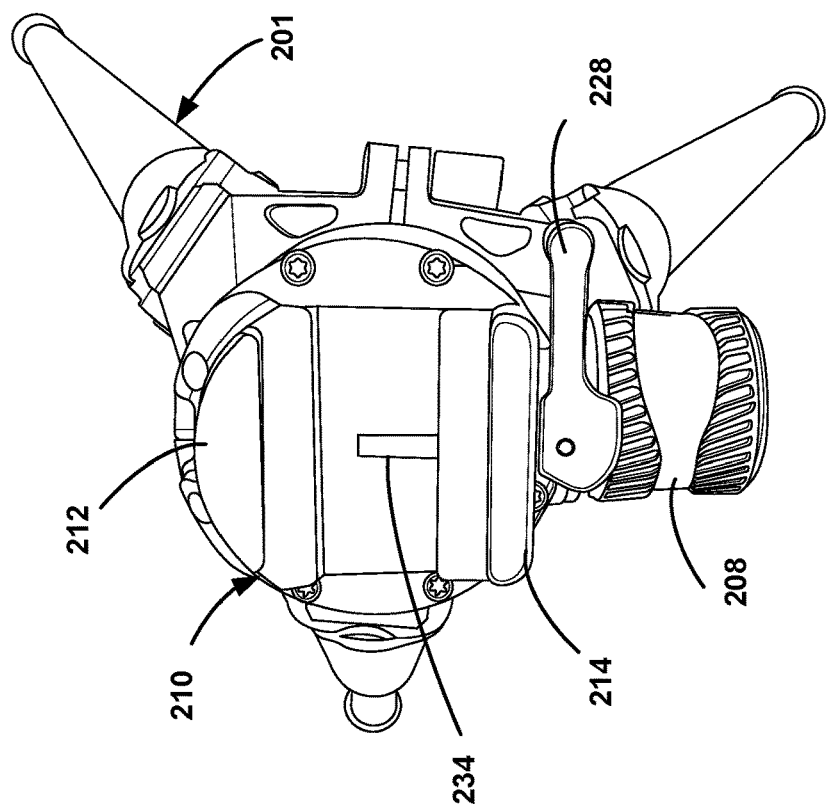
FIG. 18 illustrates a top view of the adjustable clamping device of FIG. 10, according to an exemplary embodiment.

In use, a user can adjust the distance between the first wall 212 and the second wall 214 when the lever 227 is in the unlocked position to thereby adjust a force exerted on the equipment positioned in the channel 216 when the lever 228 is subsequently moved to the locked position. In one example, the In one example, the first wall 212 includes a recess 232 into which the rotatable member 226 sits. In one such example, the rotatable member 226 comprises a shape, and the recess 232 comprises the same shape. The shape may be one of a circle, a hexagon, an octagon, a decagon, or dodecagon, as non-limiting examples. In another example, the rotatable member 226 comprise a first shape, and the recess 232 comprises a second shape that is different than but complementary to the first shape. For example, as shown in FIG. 14, the rotatable member 226 comprises a hexagon, and the recess 232 comprises a 12-sided shape. Other arrangements are possible as well.

In use, the second wall 214 is configured to be moveable by a user from a locking position to an adjustment position, where second wall 214 is closer to the first wall 212 in the adjustment position than in the locking position. When the user pushes the second wall 214 towards the first wall 212 to move the second wall 214 to the adjustment position, the rotatable member 226 extends away from the first wall 212 such that the user can rotate the rotatable member 226. As discussed above, rotating the rotatable member 226 adjusts a distance between the first wall 212 and the second wall 214 when the lever 228 is in the unlocked position. In one particular example, rotating the rotatable member 226 in a clockwise direction moves the second wall 214 closer to the first wall 212, and rotating the rotatable member 226 in a counterclockwise direction moves the second wall 214 further away from the first wall 212. When the user releases the second wall 214, the at least one spring 218 biases the second wall 214 away from the first wall 212, and the rotatable member 226 sits in the recess 232 such that the user cannot rotate the rotatable member 226.

As shown in the Figures, the adjustable clamping device 200 includes a protrusion 234 extending horizontally along the channel 216. In one example, the protrusion 234 does not contact either the first wall 212 or the second wall 214. The protrusion 234 has a width suitable to be positioned between a pair of rails of the Picatinny rail. In this manner, the raised protrusion 234 will tend to inhibit the adjustable clamping device 200 sliding with respect to the Picatinny rail because the protrusion 234 will come into contact with one of the rails of the Pictinny rail. In this manner, firearms may be quickly engaged or released from the adjustable clamping device 200 by using the protrusion 234 on the bottom of the channel 216.

As further shown in the Figures, in example embodiments the first wall 212 includes a first angled portion 236 and a second angled portion 238, and the second wall 214 includes a third angled portion 240 aligned with the first angled portion 236 and a fourth angled portion 242 aligned with the second angled portion 238. A distance between the first angled portion 236 and the third angled portion 240 is greater than a distance between the second angled portion 238 and the fourth angled portion 242. As such, the first angled portion 236 and the third angled portion 240 may be used to secure one type of equipment (e.g., photographic equipment) to the adjustable clamping device 200, while the second angled portion 238 and the fourth angled portion 242 may be used to secure another type of equipment (e.g., firearms) to the adjustable clamping device 200.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Because many modifications, variations, and changes in detail can be made to the described example, it is intended that all matters in the preceding description and shown in the accompanying figures be interpreted as illustrative and not in a limiting sense. Further, it is intended to be understood that the following clauses (and any combination of the clauses) further describe aspects of the present description.

What is claimed is:

1. A leveling base, comprising:
a housing including a cavity;
a rotatable component positioned at least partially within the cavity of the housing, wherein the rotatable component is rotatably maintained within the cavity to thereby enable a rotation of the rotatable component with respect to the housing;
a hollow elongated member having a first end and a second end opposite the first end, wherein the first end of the hollow elongated member is coupled to a bottom surface of the rotatable component;
an inner rod having a first end and a second end opposite the first end, wherein the first end of the inner rod is positioned within the hollow elongated member; and
a rotatable arm having a first end and a second end opposite the first end, wherein the first end of the rotatable arm is pivotally coupled to the second end of the inner rod, wherein the rotatable arm is configured to rotate from a first position in which a longitudinal axis of the rotatable arm is substantially parallel to a longitudinal axis of the inner rod to a second position in which the longitudinal axis of the rotatable arm is positioned at a non-zero angle with respect to the longitudinal axis of the inner rod, wherein the first end of the inner rod contacts the rotatable component to thereby prevent rotation of the rotatable component with respect to the housing when the rotatable arm is in the first position, and wherein the first end of the inner rod does not contact the rotatable component to thereby enable rotation of the rotatable component with respect to the housing when the rotatable arm is in the second position.

2. The leveling base of claim 1, wherein a length of the hollow elongated member is longer than a length of the rotatable arm.

3. The leveling base of claim 1, wherein a length of the rotatable arm is longer than a length of the hollow elongated member.

4. The leveling base of claim 1, wherein a length of the hollow elongated member is substantially equal to a length of the rotatable arm.

5. The leveling base of claim 1, wherein a distance between the first end of the inner rod and the rotatable component is greater when the rotatable arm is in the second position than when the rotatable arm is in the first position.

6. The leveling base of claim 1, wherein the first end of the rotatable arm is pivotally coupled to the second end of the inner rod via a pin.

7. The leveling base of claim 1, wherein the second end of the rotatable arm includes a gripping portion.

8. The leveling base of claim 1, wherein a distance between the first end of the inner rod and the rotatable component when the rotatable arm is in the second position is adjustable.

9. The leveling base of claim 8, wherein the second end of the rotatable arm includes a recess configured to removably house a tool configured to adjust the distance between the first end of the inner rod and the rotatable component when the rotatable arm is in the second position.

10. The leveling base of claim 9, wherein the tool comprises an Allen wrench.

11. The leveling base of claim 1, wherein at least a portion of the rotatable component comprises a spherical shape.

12. The leveling base of claim 1, further comprising:
a resilient member positioned at least partially within the hollow elongated member, wherein the resilient member biases the first end of the inner rod away from the rotatable component.

13. The leveling base of claim 1, wherein the first end of the rotatable arm includes a first cam surface and a second cam surface, and wherein the hollow elongated member includes a first cutout and a second cutout configured to receive the first cam surface and the second cam surface when the rotatable arm is in the first position.

14. The leveling base of claim 1, further comprising:
a mounting structure positioned on a top surface of the rotatable component, wherein the mounting structure comprises:
a first wall fixed with respect to the top surface of the rotatable component;
a second wall moveable with respect to the first wall;
a channel positioned between the first wall and the second wall;
at least one spring positioned between the first wall and the second wall, wherein the at least one spring is configured to bias the second wall away from the first wall;
an elongated rod having a first end and a second end opposite the first end, wherein the first end of the elongated rod extends through the first wall, and wherein the second end of the elongated rod extends through the second wall;
a rotatable member coupled to the first end of the elongated rod, wherein a rotation of the rotatable member adjusts a distance between the first wall and the second wall; and
a lever coupled to the second end of the elongated rod, wherein the lever includes a cam portion that rotates about a pivot axis to contact the second wall as the lever is moved between an unlocked position and a locked position, and wherein a distance between the first wall and the second wall is greater in the unlocked position than in the locked position.

15. An adjustable clamping device, comprising:
a base;
a ball coupled to and extending vertically from the base;
a housing including a cavity configured to receive the ball, wherein the ball is rotatably maintained within the cavity to thereby enable a rotation of the housing with respect to the ball;
a locking member configured to selectively inhibit movement of the housing with respect to the ball; and
a mounting structure positioned on a top surface of the housing, the mounting structure comprising:
a first wall fixed with respect to the top surface of the housing;
a second wall moveable with respect to the first wall;
a channel positioned between the first wall and the second wall;
at least one spring positioned between the first wall and the second wall, wherein the at least one spring is configured to bias the second wall away from the first wall;
an elongated rod having a first end and a second end opposite the first end, wherein the first end of the elongated rod extends through the first wall, and wherein the second end of the elongated rod extends through the second wall;
a rotatable member coupled to the first end of the elongated rod, wherein a rotation of the rotatable member adjusts a distance between the first wall and the second wall; and
a lever coupled to the second end of the elongated rod, wherein the lever includes a cam portion that rotates about a pivot axis to contact the second wall as the lever is moved between an unlocked position and a locked position, and wherein a distance between the first wall and the second wall is greater in the unlocked position than in the locked position.

16. The adjustable clamping device of claim 15, wherein the elongated rod is positioned between the channel and the top surface of the housing.

17. The adjustable clamping device of claim 15, wherein the locking member comprises a screw mechanism.

18. The adjustable clamping device of claim 15, wherein the first wall includes a recess into which the rotatable member sits.

19. The adjustable clamping device of claim 18, wherein the rotatable member comprises a shape, and wherein the recess comprises the shape.

20. The adjustable clamping device of claim 19, wherein the shape is one of a circle, a hexagon, an octagon, a decagon, or dodecagon.

21. The adjustable clamping device of claim 18, wherein the second wall is configured to be moveable by a user from a locking position to an adjustment position, wherein the second wall is closer to the first wall in the adjustment position than in the locking position, and wherein the rotatable member extends away from the first wall when the second wall is in the adjustment position such that the user can rotate the rotatable member, and wherein the rotatable member sits in the recess when the second wall is in the locking position such that the user cannot rotate the rotatable member.

22. The adjustable clamping device of claim 15, wherein the mounting structure is removably coupled to the housing.

23. The adjustable clamping device of claim 15, further comprising:
   a protrusion extending horizontally along the channel.

24. The adjustable clamping device of claim 23, wherein protrusion does not contact either the first wall or the second wall.

25. The adjustable clamping device of claim 15, wherein the base is configured to be removably coupled to a support structure.

26. The adjustable clamping device of claim 15, wherein the first wall includes a first angled portion and a second angled portion, wherein the second wall includes a third angled portion aligned with the first angled portion and a fourth angled portion aligned with the second angled portion, and wherein a distance between the first angled portion and the third angled portion is greater than a distance between the second angled portion and the fourth angled portion.

* * * * *